Oct. 13, 1925.  
C. J. WHITACRE  
1,556,884  
TRANSMISSION BRAKE MECHANISM FOR MOTOR VEHICLES  
Filed Oct. 24, 1923
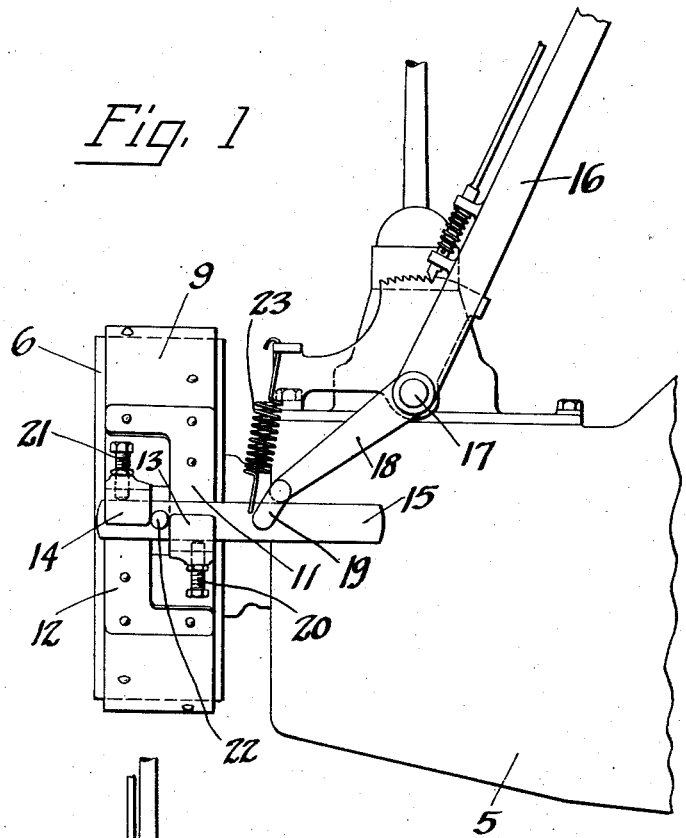
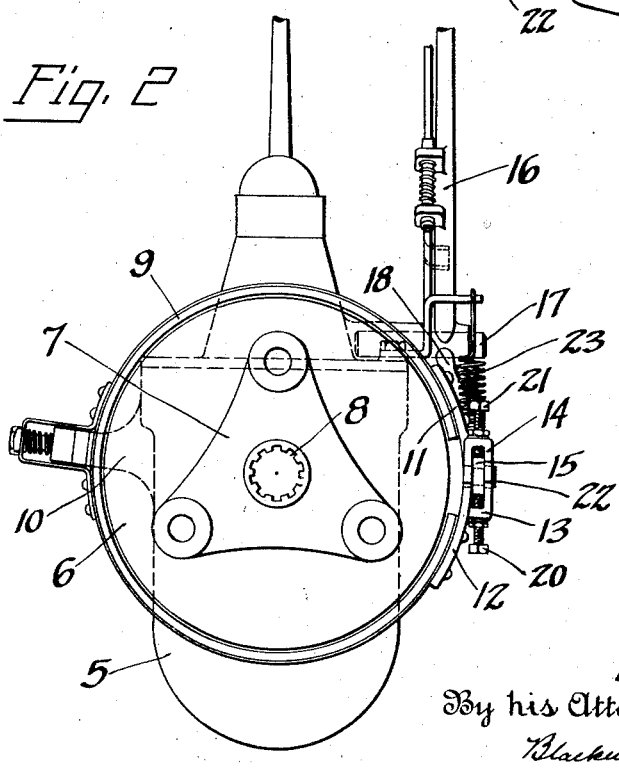
Inventor  
Clarence J. Whitacre  
By his Attorneys  
Blackmore, Spencer & Flick Patented Oct. 13, 1925.

1,556,884

UNITED STATES PATENT OFFICE.

CLARENCE J. WHITACRE, OF DETROIT, MICHIGAN, ASSIGNOR TO GENERAL MOTORS CORPORATION, OF DETROIT, MICHIGAN, A CORPORATION OF DELAWARE.

TRANSMISSION-BRAKE MECHANISM FOR MOTOR VEHICLES.

Application filed October 24, 1923. Serial No. 670,585.

*To all whom it may concern:*

Be it known that I, CLARENCE J. WHITACRE, a citizen of the United States, and a resident of Detroit, county of Wayne, and State of Michigan, have invented certain new and useful Improvements in Transmission-Brake Mechanism for Motor Vehicles, of which the following is a full, clear, concise, and exact description, such as will enable others skilled in the art to which the invention relates to make and use the same, reference being made therein to the accompanying drawings, which form a part of this specification.

My invention relates to brake mechanism for motor driven vehicles, and particularly to brake mechanism of the type or class commonly referred to as transmission brakes: and wherein the braking action is secured by friction between a brake drum secured to and rotating with a shaft through which the vehicle is driven and a relatively stationary brake band, which is forced into engagement with the periphery of the brake drum by a brake applying lever acting through a suitable force transmitting mechanism or device.

The principal object of my invention is to provide an improved mechanism or device for forcing the brake band of transmission brake mechanism into contact with the brake drum: the same being simple in construction and not likely to get out of order when in use, and the structural features thereof being such that a better and a more direct application of the brake band to the brake drum is secured with less effort on the part of the operator, than has heretofore commonly been the case.

The drawing accompanying and forming a part of this specification illustrates the preferred form of my invention; although the same may be embodied in various other specific forms and my invention includes all such variations and modifications of the particular form shown and hereinafter described as come within the scope of the concluding claims, in which the features wherein my invention consists are particularly pointed out.

In the drawing:

Figure 1 is a fragmentary view showing my improved brake mechanism in side elevation.

Figure 2 is a view showing the same in end elevation, and as seen from a position to the left of Figure 1.

Referring now to the drawing, the reference numeral 5 designates a change speed gearing casing containing the usual or any particular form of transmission gearing for securing different rates of speed of the vehicle, the same being shown in a conventional manner; and 6 is a brake drum which rotates with the propeller shaft and through which the rear wheels of the vehicle are driven from the engine through suitable gearing within the casing 5. As shown, the brake drum is secured to the rear end of a driven shaft of the transmission gearing which extends from the casing, and the usual propeller shaft which acts to drive the rear wheels of the vehicle is driven through a coupling member 7 and splined driver 8. These, however, are or may be of any form, and are in no way concerned with the invention herein; except that the invention when in use requires the presence of and cooperates with a brake drum in order to operate in its designed and contemplated manner. The numeral 9 designates a brake band comprising, as illustrated, the usual outer metallic support and a non-metallic lining which, when forced into frictional engagement with the periphery of the brake drum, acts to retard movement of the vehicle, all as is usual in brake mechanism of the type or kind to which my invention relates. The brake band made use of in my invention is of the type which is anchored at its middle portion to a fixed abutment, like the arm 10 extending from the casing 5, and in which the free ends are drawn toward one another to bring about proper engagement between the inner surface of said brake band and the periphery of the brake drum.

The free ends of the brake band 9 are shown as provided with extending portions or brackets 11, 12 which are spaced apart or offset relative to one another, and are disposed one at each side of the band. These free ends extend past one another, and are provided with outwardly opening hooks 13, 14 at their extremities; and the numeral 15 designates a floating brake applying lever extending across or overlapping the brackets 11, 12, and held in operative relation to the brake band by the hooks aforesaid within which it lies, as shown. This lever extends to one side of the band and drum and is engaged by suitable operating means such, for example, as a brake applying lever 16 pivotally supported as at 17; and the end 18 of which lever is bifurcated at 19 to provide arms lying one upon each side of the floating lever 15, to thereby prevent sidewise movement thereof. The hooks 13, 14, within which the said lever lies also act to prevent sidewise movement thereof, and to keep the same in proper position with its left hand and extending across the brackets 11, 12, as shown; and adjustable stops shown as in the form of set screws 20, 21 are preferably provided for adjusting the parts as the band wears, to thereby maintain the mechanism in proper and effective braking condition. The lever 15 is shown as provided with a transversely extending pin 22 which lies between the brackets 11, 12 and serves to prevent longitudinal movement of the lever transverse to the brackets; and a spring 23 acting under tension keeps the right hand end of the lever 15 in contact with the brake applying lever, and in place within the bifurcated end 19 of said lever.

The lever 15 is referred to as a "floating" lever because it has no fixed fulcrum and is unsupported in any fixed position, and is always free to take up a position determined entirely and only by the forces acting upon it; and in which position said forces are in equilibrium. Thus when the right hand end of said lever 15 is depressed by the brake applying lever 16 the ends of the set screws 20, 21 may either one of them be regarded as the fulcrum, and the other as the load, although neither of said set screws occupies a fixed position in the brake mechanism. Downward movement of the extending arm 18 of said lever therefore acts to swing the floating lever 15 about a point between the fulcrums provided by the ends of the set screws, and to tighten the band upon the brake drum; movement of either of said fulcrum points being arrested, as will be appreciated, when the corresponding half of the band comes into contact with the brake drum.

Having thus described and explained my invention, I claim and desire to secure by Letters Patent:

1. In brake mechanism of the class described and in combination with a rotatable brake drum, a brake band surrounding said drum and the ends of which are reduced in width and extend past one another; a floating lever overlapping the ends aforesaid and operatively connected with each of them; a brake applying lever operatively associated with said floating lever; and an abutment intermediate the ends of said brake band for preventing the same from rotating with said brake drum.

2. In brake mechanism of the class described and in combination with a rotatable brake drum, a brake band surrounding said drum and held against rotation when the same is applied to the drum, and the two ends of which band are reduced in width and extend past one another; two hooks located one at the end of each narrowed end portion of said brake band; a floating lever overlying the end portions aforesaid, and lying within said hooks; and a brake applying lever engaging said floating lever at a point to one side of said brake band and through which the same may be operated to tighten the band about the drum.

In testimony whereof I affix my signature.

CLARENCE J. WHITACRE.